F. V. DIARD.
LUBRICATOR.
APPLICATION FILED AUG. 5, 1918.
1,331,698.
Patented Feb. 24, 1920.
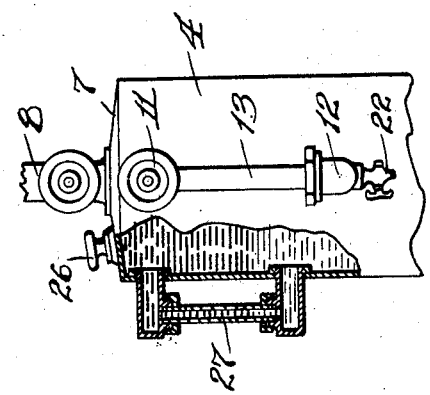
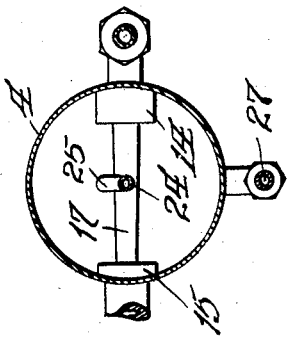
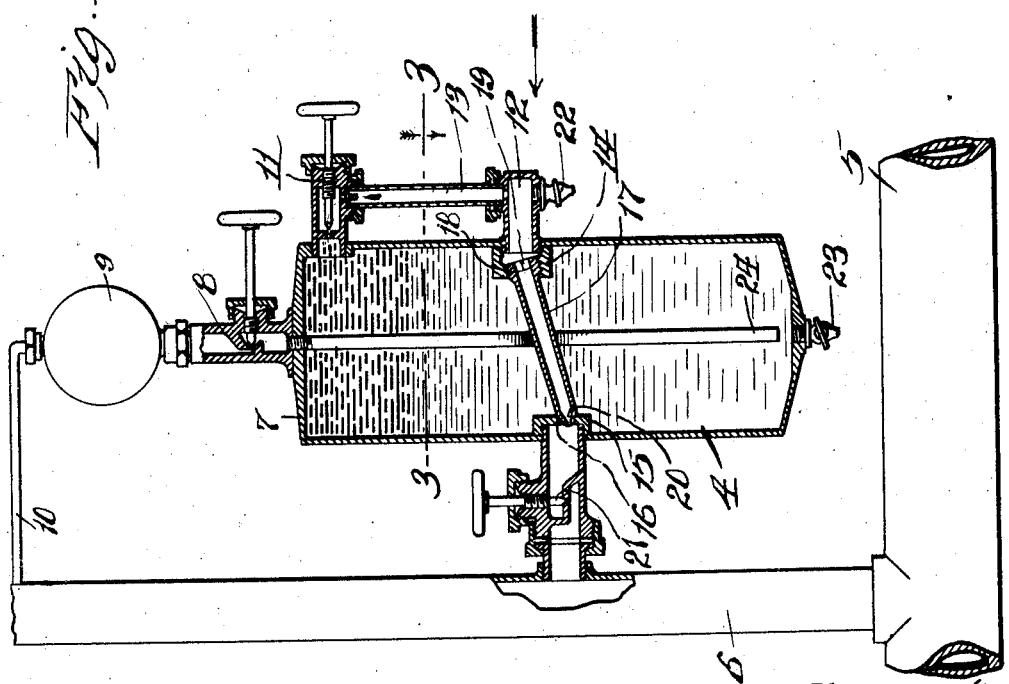
Inventor:
Felix V. Diard
By Edward E. Longan Atty

UNITED STATES PATENT OFFICE.

FELIX V. DIARD, OF KIMSWICK, MISSOURI, ASSIGNOR OF ONE-HALF TO GEORGE BALTZ, OF KIMSWICK, MISSOURI.

LUBRICATOR.

1,331,698.      Specification of Letters Patent.      Patented Feb. 24, 1920.

Application filed August 5, 1918. Serial No. 248,332.

*To all whom it may concern:*

Be it known that I, FELIX V. DIARD, a citizen of the United States, and resident of city of Kimswick, county of Jefferson, and State of Missouri, have invented certain new and useful Improvements in Lubricators, of which the following is a specification containing full, clear, and exact description, references being had to accompanying drawings, forming a part thereof.

My invention relates to sight feed lubricators, and has for its object a lubricator whereby the oil to lubricate a steam engine cylinder is fed downward through a clear glass tube instead of upward through a tube filled with water.

In the drawings,

Figure 1 is a vertical cross sectional view of my lubricator, showing its connection with the steam pipe.

Fig. 2 is a fragmental front view of my lubricator, with parts broken away and in section and viewed in direction of the arrow.

Fig. 3 is a cross sectional view taken on the line 3—3 of Fig. 1.

In carrying out my invention, I provide an oil reservoir 4 which is attached to the main steam supply pipe 5 which pipe leads from any suitable source of supply to the steam engine, neither of which being shown in the drawings. To the supply pipe 5 is attached a branch steam pipe 6 and to this pipe the lubricator is attached. On the top 7 of the lubricator is attached a valve 8, which is of any well known construction. Above the valve 8, I mount a condensing chamber 9, the use of which will be hereinafter explained. Attached to the condenser 9 and connecting it with the pipe 6 is a steam supply pipe 10, the object of which is to supply steam to the condensing chamber 9. On one side of the lubricator and near its top, I provide a needle valve 11 and approximately midway the length of the lubricator and directly underneath the valve 11, I place the connection 12. The needle valve 11 and the connection 12 are connected together by a glass tube 13, through which the rate of feed of the oil can be seen.

On the inside of the lubricator and communicating with the connection 12, I locate a screw threaded boss 14 and diametrically opposite and at a short distance below the boss 14 is located a second boss 15, having a tapered opening 16. Connecting the bosses 14 and 15 is an oil pipe 17, having its end 18 screw threaded so as to permit it being screwed in the boss 14. This is done by means of the squared opening 19, to allow the engagement of a wrench. The other end 20 of the tube 17 is tapered to fit within the tapered opening 16 of the boss 15, thereby making a leak-proof connection between the bosses. Into the boss 15 is screwed a valve 21, which valve is connected with the pipe 6. The connection 12 is provided in its lower surface with a drain cock 22, so that the oil may be withdrawn from the tube 13 in the event of the system becoming clogged. The reservoir or lubricator 4 is provided with a drain cock 23, so that the entire device may be drained of oil or water.

To the valve 8 and extending to the point near the bottom of the lubricator 4, I provide a pipe 24, the object of which is to allow the condensed moisture from the steam to enter the bottom of the reservoir and float the oil upward, into the valve 11. This pipe is provided with a bend 25, which allows it to pass around the pipe 17. On the top of the reservoir 4, I place a screw threaded plug 26, which can be removed so that the reservoir may be charged with oil.

Near the top of the reservoir 4 and located approximatey at 45° horizontally from the valve 11, or in other words the sight feed mechanism is located a gage 27 so that the amount of oil in the lubricator may be ascertained at all times and both the amount of oil fed through the sight feed and the amount of oil contained within the reservoir can be viewed simultaneously.

The operation of my device is as follows:

The reservoir having been filled with oil and the steam turned on leading from the boiler toward the engine through the pipe 5, a certain amount of this steam will pass into the pipe 6, thence into the pipe 10 and into the condenser 9. By opening the valve 8 the condensation allowed to flow into the oil reservoir 4 causes the oil contained therein to be forced or floated toward its top. As this oil rises it flows into the needle valve 11 and by its slow passage through this needle valve it is fed downward through the tube 13 in drops. From there it passes into the connection 12 downward through the pipe 17 and into the valve 21, which valve when opened allows the oil to pass into the pipe 6, then downward into the pipe 5 and then be carried to the engine cylinder. The object of the valve 21, is that when the engine is stopped this valve may be closed, so that no oil will flow into the main supply pipe and become lodged therein, and thus cause an excess supply when the engine is again started.

By the use of my device there is no water coming in contact with the oil after it has once started to feed toward the engine. In other words, dry steam charged with oil only is fed to the engine. When the water has accumulated in the reservoir so as to drive out nearly all of the oil, the valve 8 is shut off and the water drained out of the reservoir by means of the cock 23 and the reservoir refilled with oil.

I claim—

1. A lubricator comprising an oil reservoir, a condenser located above the same, a pipe connection located between the condenser and oil reservoir, a valve located in said pipe connection, a condensation conducting pipe extending from the pipe connection to a point near the bottom of the oil reservoir, a valve controlled oil outlet secured to the upper end of the oil reservoir, a connection secured to the oil reservoir beneath the valve controlled oil outlet, a sight feed tube secured between the valve controlled oil outlet and said connection, a second connection secured to the oil reservoir, said connection being directly across from and slightly below the first mentioned connection, an oil pipe detachably mounted wholly within the oil reservoir and arranged at an inclined angle and in communication with said first mentioned connection and said second mentioned connection, a main steam pipe, a branch steam pipe attached thereto, and a valve controlled connection between the branch steam pipe and the oil pipe located within the oil reservoir.

2. A lubricator comprising an oil reservoir, a condenser located above the same, a pipe connection located between the condenser and oil reservoir, a needle valve mounted in said pipe connection, a condensation conducting pipe extending from the valve connection to a point near the bottom of the oil reservoir and provided with a semi-circular bend midway its length, a valve controlled oil outlet secured to the upper end of the oil reservoir, a connection secured to the oil reservoir beneath the valve controlled oil outlet, a sight feed tube secured between the valve controlled oil outlet and said connection, a second connection secured to the oil reservoir, said connection being located opposite and below the first mentioned connection, an oil pipe detachably mounted wholly within the oil reservoir and arranged at an inclined angle and in communication with said first and second connections, a main steam pipe, a branch steam pipe attached thereto, a valve controlled connection between the branch steam pipe and the second mentioned connection, and a pipe connection leading from the branch steam pipe to the condensation chamber for admitting steam thereto.

3. A lubricator comprising an oil reservoir, a condenser located above the same, a pipe connection located between the condenser and oil reservoir, a valve located in said pipe connection, a condensation conducting pipe extending from the valve connection to a point near the bottom of the oil reservoir and provided with a semi-circular bend midway its length, a valve controlled oil outlet secured to the upper end of the oil reservoir, a connection secured to the oil reservoir beneath the valve controlled oil outlet, a sight feed tube secured between the valve controlled oil outlet and said connection, a second valve controlled connection attached to the oil reservoir, an oil pipe detachably mounted wholly within the oil reservoir and arranged at an inclined angle and in communication with said connection and said second valve controlled connection, a main steam pipe, a branch steam pipe attached thereto, a pipe connection leading from the branch steam pipe to the condensation chamber for admitting steam thereto, and a transparent oil gage secured to the oil reservoir for ascertaining the amount of oil.

In testimony whereof, I have signed my name to this specification, in the presence of two subscribing witnesses.

FELIX V. DIARD.

Witnesses:
EDWARD E. LONGAN,
WALTER C. STEIN.